(12) United States Patent
Won

(10) Patent No.: US 11,892,792 B2
(45) Date of Patent: Feb. 6, 2024

(54) TONER REFILL GUIDE BASED ON THE POSSIBILITY TONER REFILL QUANTITY IN THE PLURALITY OF IMAGE FORMING APPARATUSES

(71) Applicant: HEWLETT-PACKARD DEVELOPMENT COMPANY, L.P., Spring, TX (US)

(72) Inventor: Tae Hee Won, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/913,481

(22) PCT Filed: Dec. 22, 2020

(86) PCT No.: PCT/US2020/066536
§ 371 (c)(1),
(2) Date: Sep. 22, 2022

(87) PCT Pub. No.: WO2021/262233
PCT Pub. Date: Dec. 30, 2021

(65) Prior Publication Data
US 2023/0136045 A1 May 4, 2023

(30) Foreign Application Priority Data
Jun. 26, 2020 (KR) .......................... 10-2020-0078396

(51) Int. Cl.
*G03G 15/00* (2006.01)
*H04N 1/00* (2006.01)

(52) U.S. Cl.
CPC ....... *G03G 15/502* (2013.01); *G03G 15/5075* (2013.01); *G03G 15/556* (2013.01);
(Continued)

(58) Field of Classification Search
CPC ............. G03G 15/502; G03G 15/5075; G03G 15/556; H04N 1/00015; H04N 1/00034;
(Continued)

(56) References Cited

U.S. PATENT DOCUMENTS

| | | |
|---|---|---|
| 2005/0219284 A1 | 10/2005 | Shima |
| 2012/0027423 A1 | 2/2012 | Kawai |
| 2021/0096506 A1* | 4/2021 | Hong ................. H04N 1/00074 |

FOREIGN PATENT DOCUMENTS

| | | |
|---|---|---|
| WO | 2019/208875 A1 | 10/2019 |
| WO | 2020/009280 A1 | 1/2020 |

* cited by examiner

*Primary Examiner* — Sophia S Chen
(74) *Attorney, Agent, or Firm* — Brooks, Cameron & Huebsch, PLLC

(57) ABSTRACT

An example user terminal apparatus includes a display, a communication apparatus to communicate with an external apparatus, and a processor to, based on information on a possible first toner refill quantity of a plurality of grouped image forming apparatuses provided from the external apparatus through the communication apparatus and a toner quantity of one toner refill apparatus, control the display to display a guide message including information on the time point of toner refill, each of the image forming apparatuses which is a subject of toner refill within the group, and a possible second toner refill quantity of each of the image forming apparatuses at the time point of toner refill.

15 Claims, 10 Drawing Sheets

(52) U.S. Cl.
CPC ..... *H04N 1/00015* (2013.01); *H04N 1/00034* (2013.01); *H04N 1/00074* (2013.01); *H04N 1/00244* (2013.01); *H04N 1/00344* (2013.01); *H04N 1/00477* (2013.01)

(58) Field of Classification Search
CPC ........... H04N 1/00074; H04N 1/00076; H04N 1/00244; H04N 1/00344; H04N 1/00477
See application file for complete search history.

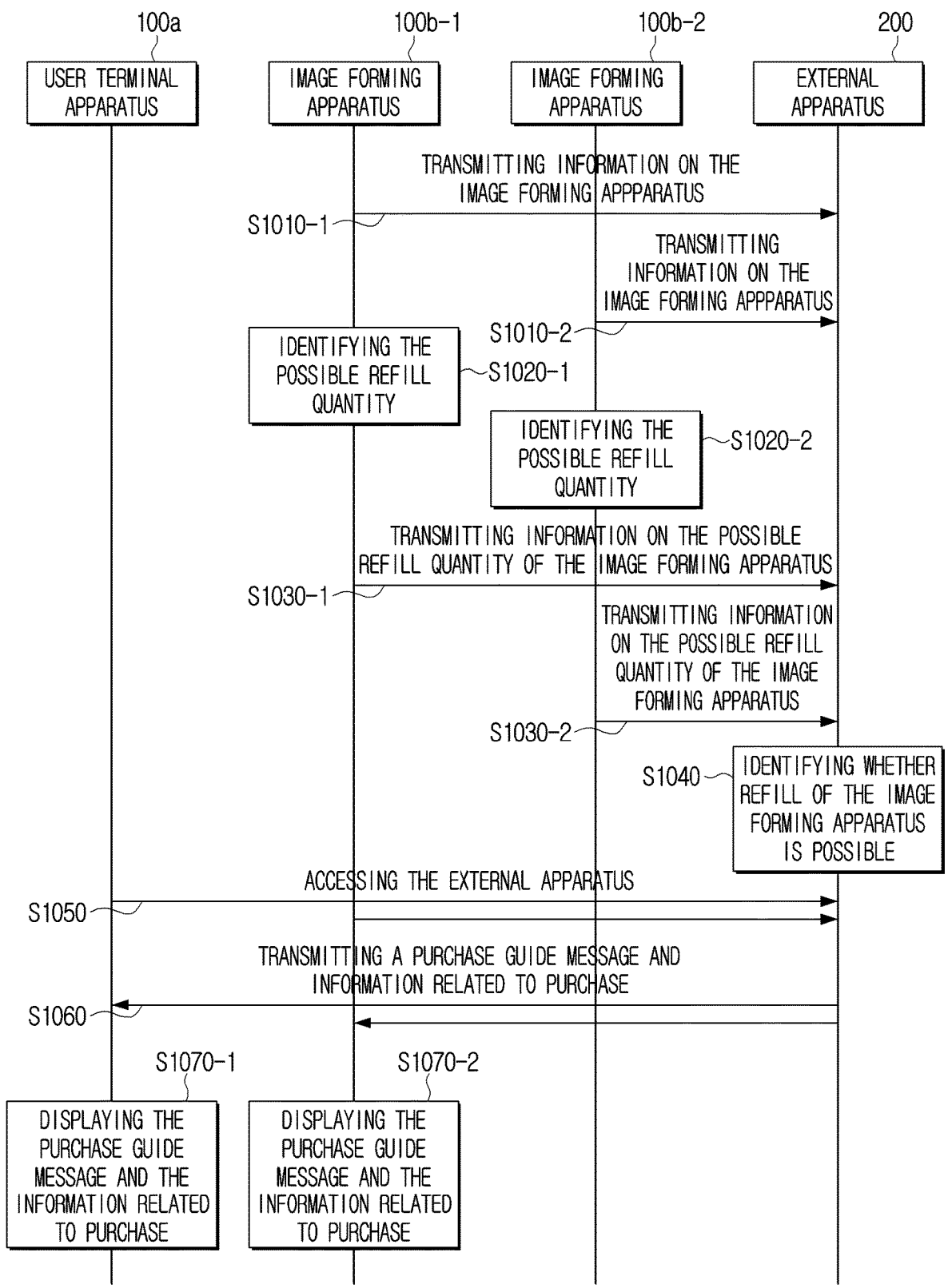

TONER REFILL GUIDE BASED ON THE POSSIBILITY TONER REFILL QUANTITY IN THE PLURALITY OF IMAGE FORMING APPARATUSES

BACKGROUND

An image forming apparatus refers to an apparatus which prints printing data generated at a terminal apparatus like a computer on a printing medium. Examples of an image forming apparatus include a copier, a printer, a facsimile, a scanner, or a multi-function printer (MFP) which implements the functions of the aforementioned apparatuses through one apparatus, etc.

BRIEF DESCRIPTION OF THE DRAWINGS

FIG. 10 is a sequence diagram illustrating a process of displaying a purchase guide message at a user terminal apparatus according to an example.

DETAILED DESCRIPTION

Figure 1:
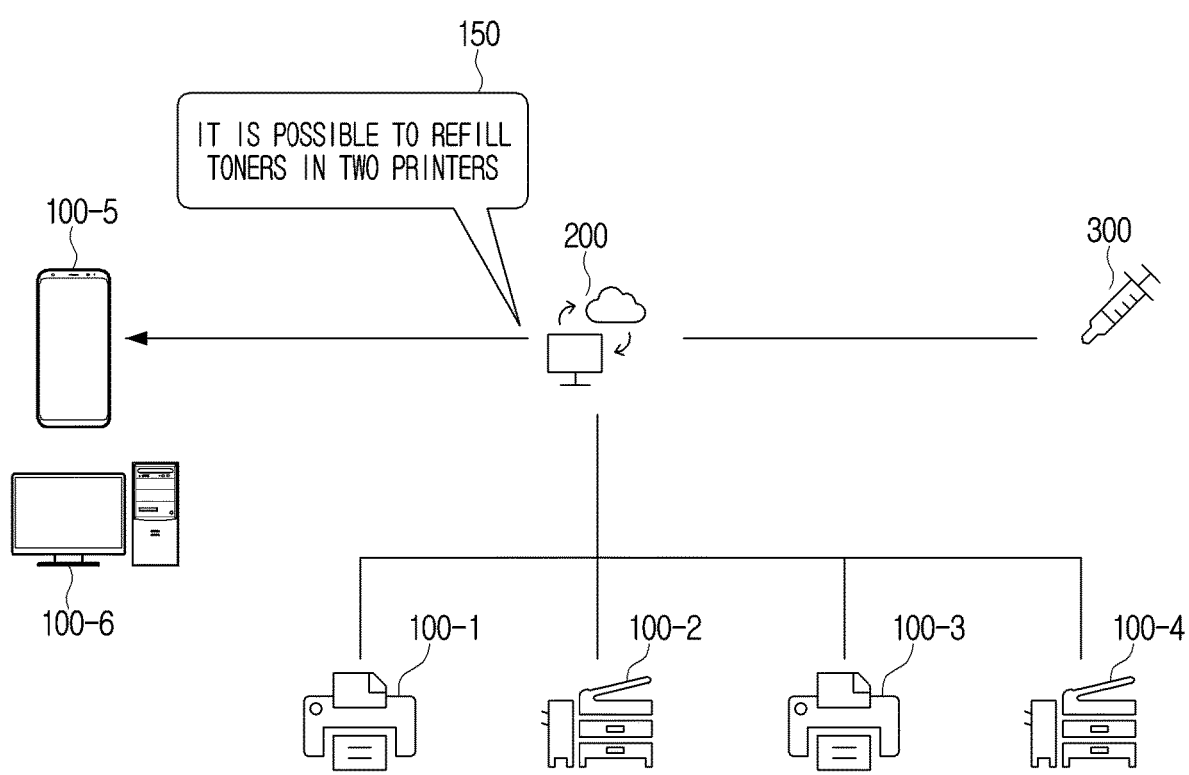
FIG. 1 is a block diagram illustrating an image forming system according to an example.

Hereinafter, various examples will be described with reference to the accompanying drawings. The examples described below may be implemented while being modified into several different forms.

In the following examples, a description that one element is "connected to" another element should be interpreted to include both the case where one element is 'directly connected to' another element, and the case where one element is 'connected to another element through still another element.' Also, a description that one element "includes" another element can be interpreted to mean that other elements may additionally be included, but not that other elements are excluded, unless there is any specific description in that regard.

In the following examples, the term "image forming job" may refer to various jobs (e.g., copying, printing, scanning, faxing, etc.) related to an image such as formation of an image or generation/storing/transmission of an image file, etc. Also, the term "job" may refer not only to an image forming job, but also to a series of processes necessary for performing an image forming job.

In addition, the term "image printing apparatus" may refer to an apparatus that prints printing data generated at a terminal apparatus like a computer on a recording medium such as paper. Examples of an image forming apparatus include a copier, a printer, a facsimile, a scanner, or a multi-function printer (MFPs) that multiply implements functions of the aforementioned apparatuses through one apparatus, etc.

Also, the term "external apparatus" may refer to an apparatus that provides information or services to a client through a network. For example, an external apparatus may be a server, a cloud, a web server, a host apparatus, etc. In a case in which an external apparatus is a server, examples of a server may include a payment server, a management server, etc. Also, a service may be provided by a physical server or by a virtual server (e.g., a cloud server).

Further, the term "user terminal apparatus" may refer to a terminal apparatus by which a user performs various jobs, and accesses an image forming apparatus or an external apparatus such as a server, etc. Examples of a user terminal apparatus may include a smartphone, a desktop computer, a laptop computer, a tablet PC, etc. Also, a user terminal apparatus may include an image forming apparatus that is connected to an external apparatus, and includes a display.

In an image forming apparatus using a laser printing method, it is possible to refill toner inside a toner cartridge by using a toner refill apparatus.

However, in an environment including several image forming apparatuses, managing toner refill may be difficult. For example, in a case in which a toner refill apparatus suitable for an image forming apparatus is purchased and used every time the toner of one image forming apparatus becomes depleted, the toner refill apparatus needs to be purchased frequently. Accordingly, effective management is difficult.

Various examples suggest a management method which can, in an environment wherein a plurality of image forming apparatuses are managed, suggest toner refill to a user (e.g., a manager) in a case in which a toner refill operation for a plurality of image forming apparatuses is possible by using one toner refill apparatus.

FIG. 1 is a block diagram illustrating an image forming system according to an example.

Referring to FIG. 1, an image forming system 1000 may include image forming apparatuses 100-1, 100-2, 100-3, 100-4, user terminal apparatuses 100-5, 100-6, and an external apparatus 200. As described above, image forming apparatuses may be included in user terminal apparatuses. Accordingly, the image forming apparatuses 100-1, 100-2, 100-3, 100-4 may perform operations performed by the user terminal apparatuses 100-5, 100-6. Hereinafter, for the convenience of description, an explanation will be made based on an example wherein the image forming apparatuses 100-1, 100-2, 100-3, 100-4 are separate apparatuses from the user terminal apparatuses 100-5, 100-6.

Each of the plurality of image forming apparatuses 100-1, 100-2, 100-3, 100-4 may include a toner cartridge. Also, when each of the plurality of image forming apparatuses 100-1, 100-2, 100-3, 100-4 receives a printing job from the user terminal apparatuses 100-5, 100-6, they may perform the printing job by using toner in the toner cartridge.

Further, each of the plurality of image forming apparatuses 100-1, 100-2, 100-3, 100-4 may transmit information on the amount of toner in the toner cartridge to the external apparatus 200. In an example, the image forming apparatuses 100-1, 100-2, 100-3, 100-4 may periodically transmit information on the amount of toner to the external apparatus 200. In a case in which the amount of toner is changed, the image forming apparatuses 100-1, 100-2, 100-3, 100-4 may transmit information on the amount of toner to the external apparatus 200. An example configuration and operation of the image forming apparatus 100b will be described later with reference to FIG. 7.

The external apparatus 200 may store apparatus information on each of the plurality of image forming apparatuses 100-1, 100-2, 100-3, 100-4. In an example, the apparatus information may include identification information (e.g., a serial number, a MAC address, etc.), model information, information on available toner refill apparatuses, information on a maximum capacity of toner, information on a remaining amount of toner, information on a possible toner refill quantity, information on a connected network, etc. of each of the image forming apparatuses.

The external apparatus 200 may store information on a toner refill apparatus 300. As an example, the toner refill apparatus 300 may perform toner refill in an image forming apparatus of the plurality of image forming apparatuses 100-1, 100-2, 100-3, 100-4. Information on the toner refill apparatus 300 may include identification information (e.g., a serial number), model information, model information of a compatible image forming apparatus, information on an initial capacity, information on a remaining amount of toner, information on an image forming apparatus that performed refill, etc. of the toner refill apparatus 300.

The external apparatus 200 may store user account information (e.g., a manager account) for each of the plurality of user terminal apparatuses 100-5, 100-6. As described above, user terminal apparatuses may include image forming apparatuses. Here, user account information may include management information of image forming apparatuses, management information of toner refill apparatuses, management information of networks, etc. Management information of image forming apparatuses may include data identification information of all image forming apparatuses included in an account, management information of toner refill apparatuses may include identification information of all toner refill apparatuses included in an account, and management information of networks may include information of all networks included in an account.

The external apparatus 200 may identify the possible toner refill quantity of each of the image forming apparatuses 100-1, 100-2, 100-3, 100-4, and identify whether a sum of the identified possible toner refill quantities is greater than or equal to a set value. In an example, the possible toner refill quantity may be a value determined by subtracting the current remaining amount of toner from the storable maximum capacity of toner, and the set value may be a value corresponding to the initial capacity of a toner refill apparatus. In a case in which the manufacturer provides toner refill apparatuses of various capacities, the set value may be among a plurality of values.

In an example, the external apparatus 200 may sum the possible toner refill quantity for each image forming apparatus that may use the same toner refill apparatus. For example, if the first to third image forming apparatuses 100-1, 100-2, 100-3 use the same toner refill apparatus, and the fourth image forming apparatus 100-4 uses a different toner refill apparatus, the external apparatus 200 may perform the aforementioned summing operation for the first to third image forming apparatuses that use the same toner refill apparatus and exclude the possible toner refill quantity of the fourth image forming apparatus 100-4.

The external apparatus 200 may sum the possible toner refill quantities when the toner quantities of the image forming apparatuses 100-1, 100-2, 100-3, 100-4 are smaller than a standard toner quantity (or, a standard toner ratio). For example, in a case in which there are 20 image forming apparatuses that each has a possible toner refill quantity corresponding to 1000 (1K) sheets of paper such that the total summed value is 20K, if 20K is greater than or equal to the set value of the toner refill apparatus, then 20 refill operations need to be performed for using up the toner refill apparatus. For avoiding such a case, for example, values having the possible toner refill quantity greater than a certain value (e.g., 8K or more) may be summed, or the possible toner refill quantities of image forming apparatuses of which a remaining amount of toner is, for example, less than a certain percentage (e.g., 50%) may be summed.

As an example, the external apparatus 200 may identify information on the possible toner refill quantities of each of the plurality of image forming apparatuses 100-1, 100-2, 100-3, 100-4 and the toner quantity of one toner refill apparatus 300. Also, the external apparatus 200 may identify information on a time point of toner refill, and information on each of the image forming apparatuses which are subjects of toner refill within the group and the possible toner refill quantity of each image forming apparatus at the time point of toner refill. The external apparatus 200 may transmit information on the possible toner refill quantities of each of the plurality of image forming apparatuses 100-1, 100-2, 100-3, 100-4 and the toner quantity of one toner refill apparatus 300 to the user terminal apparatuses 100-5, 100-6. The user terminal apparatuses 100-5, 100-6 may identify information on the time point of toner refill, and information on each of the image forming apparatuses which are subjects of toner refill within the group and the possible toner refill quantity of each image forming apparatus at the time point of toner refill based on the information received from the external apparatus 200.

If, as a result of identification, toner refill is possible, the external apparatus 200 may notify the user terminal apparatuses 100-5, 100-6 (or, image forming apparatuses for which the user performed a log-in operation) that toner refill using the toner refill apparatus 300 is possible. In an example, information on the models (or capacities) of available toner refill apparatuses and purchasing information of the toner refill apparatuses may be provided. The user terminal apparatuses 100-5, 100-6 may display a guide message including information on the time point of toner refill, and information on each of the image forming apparatuses which are subjects of toner refill within the group and the possible toner refill quantity of each image forming apparatus at the time point of toner refill.

The user may access the external apparatus 200 through the user terminal apparatuses 100-5, 100-6. The external apparatus 200 may transmit information related to refill or purchase to the connected user terminal apparatuses 100-5, 100-6. For example, the user terminal apparatuses 100-5, 100-6 may receive a notification that toner refill using the toner refill apparatus 300 is possible, such as a toner refill guide message 150, or a notification suggesting purchase from the external apparatus 200. In an example, the user terminal apparatuses 100-5, 100-6 may also receive information on the toner refill apparatus or identification information of image forming apparatuses which need toner refill. For example, information on the toner refill apparatus may include a model name of the toner refill apparatus, uniform resource locator (URL) information for a seller of the toner refill apparatus, price information, toner quantity information, etc. The external apparatus 200 may display the received toner refill guide message, information on the toner refill apparatus, identification information of image forming apparatuses which need toner refill, etc. An example process and display method for a refill guide message and a notification suggesting purchase will be described later.

In describing FIG. 1, it was illustrated that four image forming apparatuses 100-1, 100-2, 100-3, 100-4 are connected to the external apparatus 200. However, in other examples, more or fewer image forming apparatuses may be connected, and image forming apparatuses may be connected via a router, etc. instead of being connected directly. Also, in FIG. 1, the two user terminal apparatuses 100-5, 100-6 are illustrated. However, more or fewer user terminal apparatuses may be connected, and image forming apparatuses may perform the function of user terminal apparatuses.

In addition, in FIG. 1, an example was described in which the external apparatus 200 consists of one apparatus. However, the external apparatus 200 may be implemented as a plurality of servers. The one external apparatus 200 may perform various functions and the one external apparatus 200 may perform one function. For example, the one external apparatus 200 may perform a function of identifying whether to perform toner refill of each of the plurality of image forming apparatuses 100-1, 100-2, 100-3, 100-4 and a toner purchase function together. Alternatively, the first external apparatus may perform a function of identifying whether to perform toner refill of each of the plurality of image forming apparatuses 100-1, 100-2, 100-3, 100-4, and the second external apparatus may perform a toner purchase function.

The plurality of image forming apparatuses 100-1, 100-2, 100-3, 100-4 may be managed as a plurality of groups. As an example, the first and second image forming apparatuses 100-1, 100-2 may be managed as a first group, and the third and fourth image forming apparatuses 100-3, 100-4 may be managed as a second group. In an example, one external apparatus may manage all of the first to fourth image forming apparatuses 100-1, 100-2, 100-3, 100-4 of the first group and the second group. Alternatively, the first external apparatus may manage the first and second image forming apparatuses 100-1, 100-2 included in the first group, and the second external apparatus may manage the third and fourth image forming apparatuses 100-3, 100-4 included in the second group. Alternatively, the first external apparatus managing the history of image forming apparatuses and the second external apparatus determining and guiding whether use of toner refill apparatuses is possible may be distinguished. The first external apparatus and the second external apparatus may transmit and receive necessary information through communication.

In other various examples, the image forming system 1000 may be implemented as a system 1000 in various forms according to the number of image forming apparatuses, the number of user terminal apparatuses, the network environment, etc. Hereinafter, for sake of convenience, an explanation will be made based on an example wherein one external apparatus 200 performs various functions.

Figure 2:
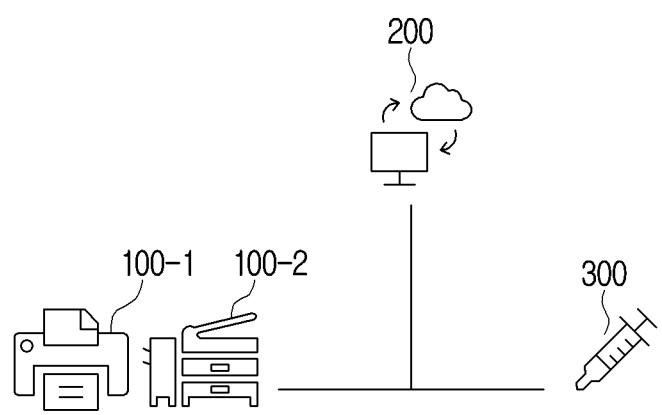
FIG. 2 is a diagram illustrating a toner refill operation according to an example.

FIG. 2 is a diagram illustrating a toner refill operation according to an example.

Referring to FIG. 2, the image forming apparatuses 100-1, 100-2, the external apparatus 200, and the toner refill apparatus 300 are illustrated. The toner of each of image forming apparatus 100-1, 100-2 may be refilled by using the toner refill apparatus 300. The toner refill apparatus 300 may refill toner of an image forming apparatus based on the possible toner refill quantities of the image forming apparatuses 100-1, 100-2 and the toner quantity of the toner refill apparatus 300. Alternatively, toner of an image forming apparatus may be refiled by a plurality of toner refill apparatuses. When the user refills the toner of the image forming apparatuses 100-1, 100-2 by using the toner refill apparatus 300, the user may identify the proceeding situation of refill (e.g., the refill quantities of the toners). Accordingly, the user may refill image forming apparatuses by using the toner refill apparatus 300 as much as needed.

The image forming apparatuses 100-1, 100-2 may be connected with the external apparatus 200 through a network. Each of the image forming apparatuses 100-1, 100-2 may transmit apparatus information of the image forming apparatuses 100-1, 100-2 to the external apparatus 200. Also, the toner refill apparatus 300 may be connected with the external apparatus 200 through a network and the toner refill apparatus 300 may transmit information of the toner refill apparatus 300 to the external apparatus 200. Alternatively, if the toner refill apparatus 300 is connected with the image forming apparatuses 100-1, 100-2 for refill, the image forming apparatuses 100-1, 100-2 may transmit information of the toner refill apparatus 300 to the external apparatus 200 connected through communication. In an example, the external apparatus 200 may receive user account information through a user terminal apparatus.

In a case in which the existing information is changed, the image forming apparatuses 100-1, 100-2 and the toner refill apparatus 300 may transmit the changed information to the external apparatus 200. Accordingly, the external apparatus 200 may receive the changed information from the image forming apparatuses 100-1, 100-2 and the toner refill apparatus 300, and update the stored information. In that case, the external apparatus 200 may maintain the information of the image forming apparatuses 100-1, 100-2 and the toner refill apparatus 300 as the recent information. In an example, model information of compatible toner refill apparatuses of image forming apparatuses or model information of compatible image forming apparatuses of toner refill apparatuses may be received by the external apparatus 200 from each apparatus, from a website, etc. and updated.

The possible toner refill quantities of the image forming apparatuses 100-1, 100-2 may be calculated as a difference between the storable maximum capacity of toner and the remaining amount of toner. For example, if the storable maximum capacity of toner is 10K and the remaining amount of toner is 6K, the possible toner refill quantity may be calculated as 4K. The storable maximum capacity of toner, the remaining amount of toner, and the possible toner refill quantity may be transmitted to the external apparatus 200 through a network. Also, in a case in which the received information on the remaining amount of toner, and the possible toner refill quantity has been changed, the external apparatus may update the existing information to new information.

A user terminal apparatus (including image forming apparatuses) may log in by connecting to the external apparatus 200 through a network. The user terminal apparatus may maintain the logged-in state. In a case in which the network information of the image forming apparatuses 100-1, 100-2 and the network information of the toner refill apparatus 300 coincide and the user account of the user terminal apparatus is in a logged-in state, information on purchase or refill of the toner refill apparatus 300 may be transmitted to the user terminal apparatus. In an example, the external apparatus 200 may group the plurality of image forming apparatuses 100-1, 100-2 and manage them. For example, the external apparatus 200 may manage an image forming apparatus connected by the same network as one group. Alternatively, the external apparatus 200 may manage an image forming apparatus included in the management information of image forming apparatuses of the logged-in user account as one group.

Figure 3:
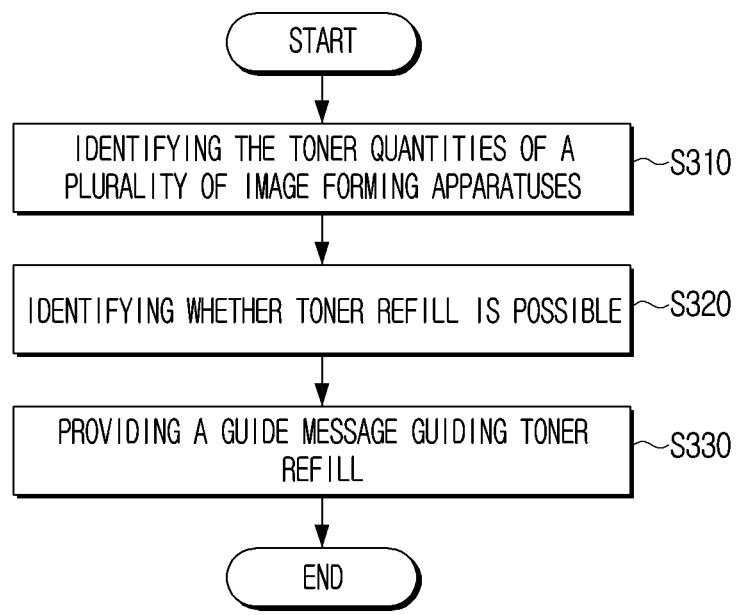
FIG. 3 is a flow chart illustrating a managing method at an external apparatus according to an example.

FIG. 3 is a flow chart illustrating a managing method at an external apparatus according to an example.

Referring to FIG. 3, the external apparatus may identify the possible toner refill quantity of each of the plurality of image forming apparatuses at operation S310. For example, the external apparatus may store address information, model information, information on a remaining amount of toner, or information on available toner refill apparatuses of each of the plurality of image forming apparatuses, and identify a difference between a maximum capacity of toner and the remaining amount of toner as the possible toner refill quantity. When the stored information on the remaining amount of toner, etc. is updated, the external apparatus may reidentify the possible toner refill quantity of each of the plurality of image forming apparatuses. In an example, the external apparatus may store the aforementioned possible toner refill quantity as information on image forming apparatuses.

The external apparatus may identify whether toner refill of image forming apparatuses is possible at operation S320. For example, the external apparatus may compare a sum of the identified possible toner refill quantities of the plurality of image forming apparatuses and a toner quantity of one toner refill apparatus and determine whether toner refill using the toner refill apparatus is possible. In this case, the external apparatus may compare the sum of the identified possible toner refill quantities of the image forming apparatuses that may use the same toner refill apparatus and the toner quantity of one toner refill apparatus and determine whether toner refill is possible. Alternatively, the external apparatus may compare the sum of the identified possible toner refill quantities of the plurality of image forming apparatuses of which ratio of the remaining amount of toner is smaller than the set standard ratio and the toner quantity of the toner refill apparatus and determine whether toner refill is possible. The toner quantity of a toner refill apparatus may vary according to the model of the toner refill apparatus or the manufacturer of the toner refill apparatus.

Alternatively, the external apparatus may compare a possible first toner refill quantity of the entire plurality of image forming apparatuses included in one group and a minimum capacity of the toner quantity of one toner refill apparatus. Based on the comparison, the external apparatus may identify that the plurality of image forming apparatuses within the group are subjects of toner refill when the first toner quantity is greater than or equal to the minimum capacity.

The external apparatus may provide a guide message to guide toner refill using the toner refill apparatus to a user terminal apparatus at operation S330. A guide message to guide toner refill may include a message to guide purchase of a toner refill apparatus. For example, the external apparatus may provide the guide message to a user terminal apparatus (including image forming apparatuses) for which the user performed log-in. The external apparatus may provide information on the toner refill apparatus to the user terminal apparatus together with the guide message. For example, information on the toner refill apparatus may include the model name of the apparatus, URL information of a seller of the toner refill apparatus, price information, toner quantity information, etc. Also, the external apparatus may provide identification information of a plurality of image forming apparatuses which need toner refill among the image forming apparatuses managed by the external apparatus to the user terminal apparatus together with the guide message. In a case in which there are toner refill apparatuses of different capacities, the external apparatus may determine the optimal toner refill apparatus among the different toner refill apparatuses and provide information on the determined toner refill apparatus together.

In an example, the external apparatus may compare the possible first toner refill quantity of the entire plurality of image forming apparatuses included in one group and the minimum capacity of the toner quantity of one toner refill apparatus and identify subjects of toner refill. As an example, the external apparatus may provide a message to guide purchase of a toner refill apparatus among a toner refill apparatus including a toner quantity of the minimum capacity, a toner refill apparatus compatible with the toner refill apparatus including a toner quantity of the minimum capacity, or a toner refill apparatus which includes a toner quantity of a capacity greater than the minimum capacity and smaller than the first toner quantity and is compatible to a user terminal apparatus. For example, the external apparatus may provide a purchase guide for the toner refill apparatus based on the first toner quantity to a user terminal apparatus.

Also, toner of the first image forming apparatus, which is a subject of toner refill within the group, may be refilled by using one toner refill apparatus. Information related to refill may be transmitted to the external apparatus. The external apparatus may identify whether the remaining amount of the toner quantity of the toner refill apparatus is smaller than the possible toner refill quantity of the second image forming apparatus within the group. The external apparatus may provide a message to guide toner refill of the second image forming apparatus to a user terminal apparatus. The user terminal apparatus may display the provided information on the display. In an example, in a case in which the user refills the toner of an image forming apparatus by using the toner refill apparatus, the used toner refill apparatus may provide information on a remaining amount of toner of the toner refill apparatus to the external apparatus or a user terminal apparatus. For example, the information on the remaining amount of toner of the toner refill apparatus may be directly provided to the external apparatus through a network or indirectly provided to the user terminal apparatus through the external apparatus. Here, the image forming apparatus may provide a changed state of the possible toner refill quantity and the remaining amount of toner to the external apparatus or a user terminal apparatus.

In various examples, the toner quantities of a plurality of toner cartridges are used similarly, and accordingly, it is possible to make the time points of replacement of the plurality of toner cartridges coincide.

The aforementioned example method may be implemented as a program and provided to an image forming apparatus. As an example, a program including the method may be stored in a non-transitory computer readable medium and provided.

Figure 4:
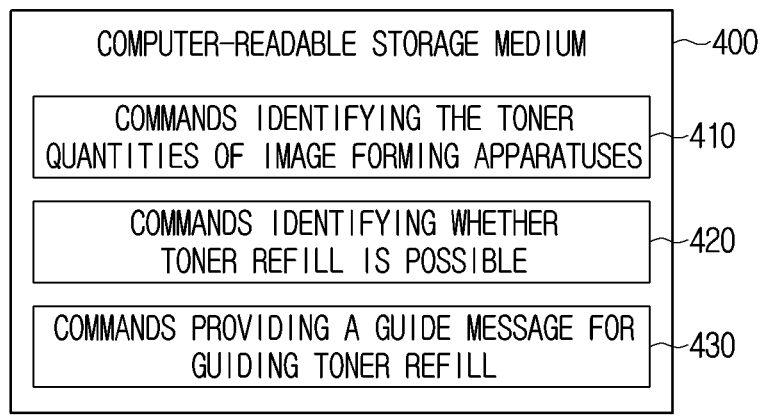
FIG. 4 is a diagram illustrating commands stored in a computer readable storage medium according to an example.

FIG. 4 is a diagram illustrating commands stored in a computer readable storage medium according to an example.

Referring to FIG. 4, a computer readable storage medium 400 may store commands related to the aforementioned operations of an image forming apparatus. For example, the computer readable storage medium 400 may store commands 410 to identify a toner quantity of an image forming apparatus, commands 420 to identify whether toner refill is possible, and commands 430 to provide a guide message for guiding toner refill.

Hereinafter, an example of displaying information provided to a user terminal apparatus will be described.

Figure 5:
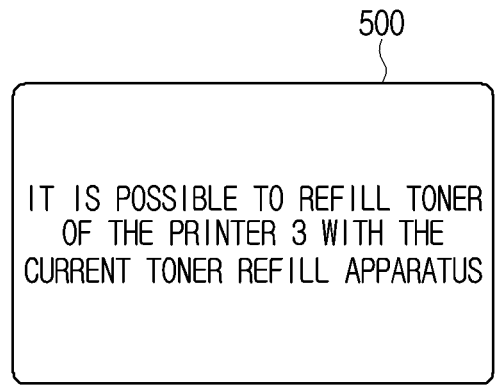
FIG. 5 is a diagram illustrating a user interface window according to an example.

FIG. 5 is a diagram illustrating a user interface window according to an example.

Referring to FIG. 5, when a user terminal apparatus accesses an external apparatus, the user terminal apparatus may receive information related to toner refill of an image forming apparatus or purchase of a toner refill apparatus from the external apparatus. Also, the user terminal apparatus may display information related to refill or purchase received from the external apparatus on the display.

For example, information related to toner refill may include a guide message to guide refill of toner for an image forming apparatus, identification information of an image forming apparatus which needs toner refill among a plurality of image forming apparatuses managed by the external apparatus, etc. As an example, as illustrated in FIG. 5, in a case in which the toner of a third printer (e.g., image forming apparatus) needs refill and the third printer can be refilled by the toner refill apparatus, the external apparatus may transmit a refill guide message for the third printer. The user terminal apparatus may display the received refill guide message 500 such as "It is possible to refill the toner of the printer 3 with the current toner refill apparatus" on the display.

In a case in which the user refills the toner of the printer 3 by using the toner refill apparatus, the external apparatus may transmit information on a change of a remaining amount of toner of the toner refill apparatus to the user terminal apparatus as toner refill by the toner refill apparatus is performed. The user terminal apparatus may display the received information on change related to the proceeding of refill on the display.

In an example, the user terminal apparatus may manage the first image forming apparatus and the second image forming apparatus. Also, the user terminal apparatus may transmit the management information of the image forming apparatuses to the external apparatus. The external apparatus may identify that the first image forming apparatus and the second image forming apparatus share a toner refill apparatus A based on the information received from the image forming apparatuses or the toner refill apparatus. As an example, the external apparatus may identify that the toner quantity of the toner refill apparatus A is 5K, and the possible toner refill quantity of the first image forming apparatus is 3K. In a case in which the possible toner refill quantity of the first image forming apparatus satisfies the condition of possibility of refill, the external apparatus may transmit a refill guide message and identification information of the first image forming apparatus to the user terminal apparatus in a similar manner to what is illustrated in FIG. 5. The user terminal apparatus may display the received message and information on the display.

The user may refill the toner of the first image forming apparatus by using the toner refill apparatus A according to the guide of the external apparatus. The first image forming apparatus and the toner refill apparatus A may transmit the changed information according to refill to the external apparatus. For example, the first image forming apparatus may transmit an intermediate value or a final value wherein the possible toner refill quantity is changed from 3K to 0K to the external apparatus. The toner refill apparatus A may transmit an intermediate value or a final value wherein the toner quantity is changed from 5K to 2K to the external apparatus. The external apparatus may transmit the intermediate value or the final value of the first image forming apparatus or the toner refill apparatus that changes according to refill to the user terminal apparatus. Alternatively, the user terminal apparatus may receive the changed information of the toner refill apparatus from the toner refill apparatus. The user terminal apparatus may display the received information on the display.

In an example, when refill of the toner of the first image forming apparatus is completed, the toner quantity of the toner refill apparatus A compatible with the first image forming apparatus may be 2K. Meanwhile, the possible toner refill quantity of the second image forming apparatus managed by the user terminal apparatus may be 2.5K. The external apparatus may compare the possible toner refill quantity of the second image forming apparatus and the toner quantity of the toner refill apparatus A. In a case in which the possible toner refill quantity of the second image forming apparatus is greater than the toner quantity of the toner refill apparatus, the external apparatus may transmit a refill guide message for the second image forming apparatus to the user terminal apparatus, and the user terminal apparatus may display the received information.

In a case in which the toner quantity of the toner refill apparatus A is smaller than or equal to a specific value, the external apparatus may transmit information related to purchase. Information related to purchase may be information regarding the toner refill apparatus. For example, information on the toner refill apparatus may include the model name of the toner refill apparatus, URL information of a seller of the toner refill apparatus, price information, toner quantity information, etc. The user terminal apparatus may display the received information on the toner refill apparatus together with the refill guide message. The URL information displayed on the user terminal apparatus may be linked to a website of the seller, and the user may directly access the website of the seller of the toner refill apparatus based on the user terminal apparatus and the received URL information.

Hereinafter, example block diagrams of a user terminal apparatus, an image forming apparatus, and an external apparatus included in an image forming system will be described.

Figure 6:
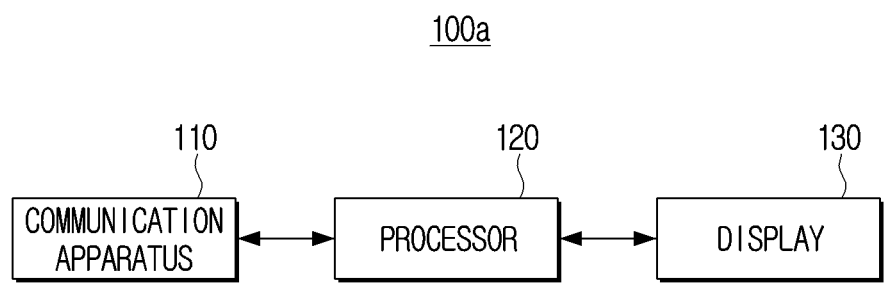
FIG. 6 is a block diagram illustrating a user terminal apparatus according to an example.

FIG. 6 is a block diagram illustrating a user terminal apparatus according to an example.

Referring to FIG. 6, the user terminal apparatus 100*a* may include a communication apparatus 110, a processor 120, and a display 130.

The communication apparatus 110 may perform communication with an external apparatus, a toner refill apparatus, etc. For example, the communication apparatus 110 may communicate through a local area network (LAN), an Internet network, a universal serial bus (USB) port, a wireless communication (e.g., WiFi 802.11a/b/g/n, NFC, Bluetooth) port, etc. The communication apparatus 110 as described above may also be referred to as a transceiver.

The communication apparatus 110 may receive a toner refill guide message for an image forming apparatus, identification information of an image forming apparatus which needs toner refill, a message related to purchase of a toner refill apparatus, information on a toner refill apparatus, information on a changed state of a remaining amount of toner of a toner refill apparatus, etc. from an external apparatus. Alternatively, the communication apparatus 110 may receive information on a toner refill apparatus, and information on a changed state of a remaining amount of toner of a toner refill apparatus from the toner refill apparatus.

The processor 120 may perform processing such that a guide message to guide toner refill for an image forming apparatus by using a toner refill apparatus is displayed on the display 130 based on the information provided from the external apparatus. In an example, a guide message may be a message to guide toner refill for a plurality of image forming apparatuses with one toner refill apparatus. Also, the processor 120 may perform processing such that identification information of a plurality of image forming apparatuses which need toner refill among the image forming apparatuses managed by the external apparatus, and information on the changed state of the remaining amount of toner of a toner refill apparatus are displayed on the display.

In an example, the processor 120 may perform processing such that a message related to purchase of a toner refill apparatus and information on a toner refill apparatus are displayed on the display 130 together with a guide message. For example, information on a toner refill apparatus may include the model name of the toner refill apparatus, the URL information for the seller of the toner refill apparatus, the price information, the toner quantity information, etc.

The processor 120 as described above may consist of a single apparatus such as a CPU, and it may also consist of a plurality of apparatuses such as a clock generation circuit, a CPU, a graphic processor, etc.

The display 130 may display a message, information, etc. received from an external apparatus or a toner refill apparatus according to control of the processor 120. Also, the display 130 may display a state pop-up window or a state identification page of an image forming apparatus. In addition, the display 130 may display data processed at the user terminal apparatus 100*a*. For example, the display 130 may display data such as an execution screen of an application program driven at the user terminal apparatus 100*a*, a user interface, etc. For example, the display 130 may be implemented as a liquid crystal display (LCD), a light emitting diode (LED), an organic LED (OLED), a display in a flexible form, a touch screen, etc.

Although not illustrated in FIG. 6, the user terminal apparatus 100*a* may further include a memory to store the received information, etc., a speaker to output the received information, etc. as a voice, and an input apparatus to receive an input of a user command, etc. For example, the user terminal apparatus 100*a* may store a received message related to refill or purchase and information on various types of apparatuses, etc. in a memory, and output them as a voice through a speaker. Also, the user terminal apparatus 100*a* may display the URL information for the seller of a toner refill apparatus on the display 130, and if a user command selecting the displayed URL information is input through an input apparatus, the user terminal apparatus 100*a* may be connected to the linked website of the seller.

Figure 7:
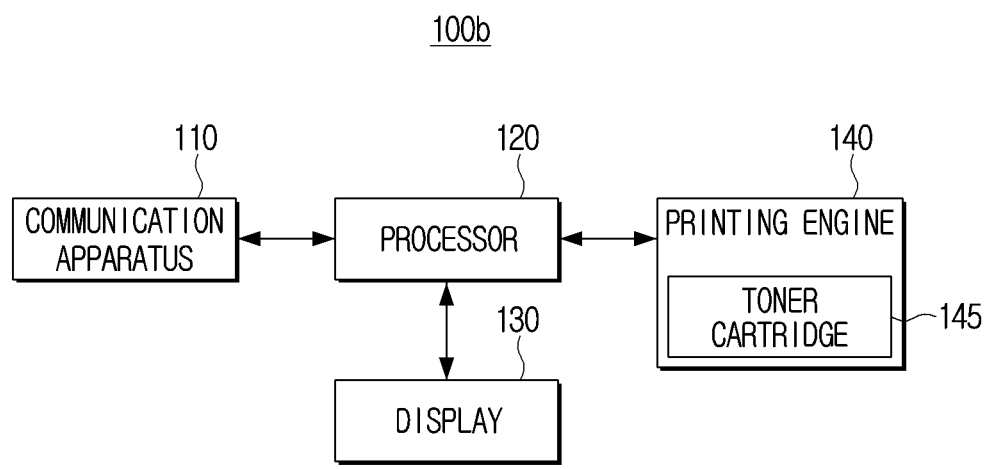
FIG. 7 is a block diagram illustrating an image forming apparatus according to an example.

FIG. 7 is a block diagram illustrating an image forming apparatus according to an example.

Referring to FIG. 7, the image forming apparatus 100*b* may include a communication apparatus 110, a processor 120, a display 130, and a printing engine 140.

The communication apparatus 110 may be connected with a user terminal apparatus and may receive printing data from the user terminal apparatus. In an example, the user terminal apparatus is an electronic apparatus that provides printing data, and it may include a server, a PC, a laptop computer, a tablet PC, a smartphone, etc.

The communication apparatus 110 may communicate with a memory chip attached to the toner refill apparatus 300 in FIG. 1. For example, in a case in which the toner refill apparatus 300 is connected with an image forming apparatus 100*b*, the communication apparatus 110 may perform communication with the memory chip of the toner refill apparatus 300.

In an example, the communication apparatus 110 may be electronically connected with the toner refill apparatus 300 through a plurality of terminals mounted on a main body of the image forming apparatus 100*b*, or perform communication with the memory chip of the toner refill apparatus by an radio frequency identification (RFID) method.

The communication apparatus 110 may transmit identification information, address information, model information, information on a remaining amount of toner, or information on an available toner refill apparatus of the image forming apparatus 100*b* to an external apparatus. In addition, in a case in which toner is refilled by the toner refill apparatus, the communication apparatus 110 may transmit a possible toner refill quantity of the image forming apparatus, information on a changed state of a remaining amount of toner of the image forming apparatus, information on a changed state of a remaining amount of toner of the toner refill apparatus, etc. to the external apparatus.

The processor 120 may control each component inside the image forming apparatus 100*b*. For example, if the processor 120 receives printing data from the user terminal apparatus, the processor 120 may control the printing engine 140 such that the received printing data is printed.

Also, the processor 120 may identify whether the toner refill apparatus 300 is connected with the image forming apparatus 100. For example, if electronic connection or NFC communication connection with the memory chip of the toner refill apparatus 300 is identified, the processor 120 may identify that the toner refill apparatus 300 is connected.

If the toner refill apparatus 300 is connected, the processor 120 may identify whether the toner refill apparatus 300 can be used. For example, the processor 120 may identify whether the toner refill apparatus 300 can be used based on information stored in the memory chip of the toner refill apparatus 300. As an example, the processor 120 may read the information stored in the memory chip, and perform an authentication process of determining whether the connected toner refill apparatus 300 is a legitimate apparatus based on the information stored in the memory chip.

If the toner refill apparatus 300 is an authenticated apparatus, the processor 120 may identify whether the toner refill apparatus 300 can be used. For example, the processor 120 may identify that toner refill can proceed by using the information stored in the toner refill apparatus 300 currently connected.

If an error occurred in the toner refill process, for example, in a case in which the power of the image forming apparatus 100*b* was turned off in the refill process, in a case in which some toner was refilled by a user's mistake, in a case in which a temporary abnormality occurred in the inlet or the duct, etc., a method for reusing the toner refill apparatus 300 is required.

Accordingly, in a case in which information related to an image forming apparatus is stored and the stored information coincides with the information of the image forming apparatus 100*b*, i.e., in a case in which a serial code stored in the memory chip coincides with a serial code of the image forming apparatus 100*b*, the processor 120 may identify that the toner refill apparatus 300 can be used. If it is identified that the toner refill apparatus 300 can be used, the processor 120 may control a door member such that the door member opens a hole to accept toner.

If a set event occurs during a toner refill process, the processor 120 may determine that an error occurred during toner infiltration. For example, if toner infiltration from a toner cartridge 145 was not completed within a set time, the processor 120 may determine that an error occurred. That is, if an event of completion of toner infiltration does not occur during a set time, the processor 120 may determine that an error occurred.

Also, if a button notifying that a toner error occurred is selected during the toner infiltration process, the processor 120 may identify that an error occurred. Such a button may be a dedicated button that is attached around the sealing cover and may receive input of the fact that a toner error occurred, and it may also be a button to perform another function.

That is, the processor 120 may activate a button provided on the main body of the image forming apparatus 100b with a function of receiving input of an error instead of its inherent function during the toner refill process. Accordingly, the user may notify the processor 120 that an error occurred by an operation of selecting the button provided on the main body during the toner refill process. In an example, the aforementioned button may be a power button, a cancellation button, a printing button, etc.

If an error is identified during the toner refill process, the processor 120 may store information on the error in the toner cartridge 145. For example, the processor 120 may store information on the toner refill apparatus 300 in the toner cartridge 145. In an example, the processor 120 may store a serial number of the toner refill apparatus 300 in the toner cartridge 145. Alternatively, the processor 120 may set flag information indicating that there is history that an error occurred in the toner cartridge 145, and store the serial number of the toner cartridge 145 in a separate storage.

When toner refill is completed, the processor 120 may store information on the completion of toner refill in the memory chip.

The display 130 may display a message, information, etc. received from an external apparatus or a toner refill apparatus according to control of the processor 120. As described above, a user terminal apparatus may include an image forming apparatus. Accordingly, the display 130 may perform the same function as the aforementioned function of a user terminal apparatus when an image forming apparatus is used as a user terminal apparatus. Thus, a repetitive description in this regard will be omitted.

The printing engine 140 is to form an image. For example, the printing engine 140 may include the toner cartridge 145 to form an image on an image forming medium such as a photosensitive drum, an intermediate transfer belt, and a paper transfer belt.

Also, the printing engine 140 may include various consumable apparatuses that are directly or indirectly involved in an image forming job. For example, in the case of a laser image forming apparatus, a charging apparatus, an exposure apparatus, a developing apparatus, a transfer apparatus, an anchoring apparatus, various types of rollers, a belt, an organic photo conductor (OPC) drum, etc. may become consumable apparatuses. Furthermore, various types of apparatuses for which replacement is required such as a developing apparatus may be defined as consumable apparatuses. One of such consumable apparatuses is the toner cartridge 145, and the toner cartridge 145 may perform the function of the aforementioned developing apparatus.

In the description of the above examples, simple components constituting an image forming apparatus were illustrated and described. However, in other examples, various components may be additionally provided.

Figure 8:
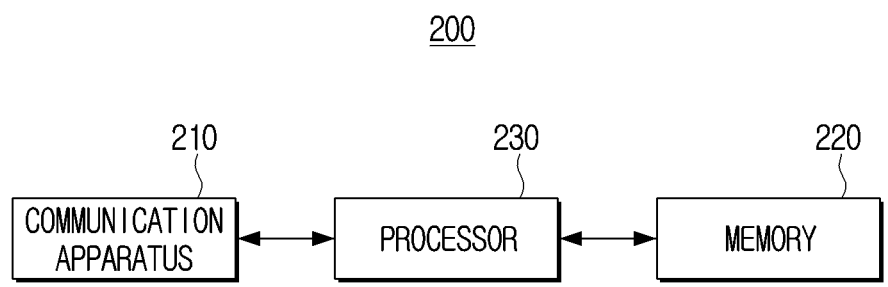
FIG. 8 is a block diagram illustrating an external apparatus according to an example.

FIG. 8 is a block diagram illustrating an external apparatus according to an example.

Referring to FIG. 8, the external apparatus 200 may include a communication apparatus 210, a memory 220, and a processor 230. For such an external apparatus 200, not only a general server, but also a lightweight directory access protocol (LDAP) server may be used.

The LDAP refers to a software protocol to enable each search of specific information (e.g., a phone number, an address, an organization, a file, a location of hardware such as a printer, an account, etc.) on a network. In an example, the LDAP server is a server that stores and manages information as described above by a directory method for providing the information as described above to another apparatus easily.

The communication apparatus 210 is formed to connect the external apparatus 200 with another apparatus, and it may not only be in a form of being connected through a local area network (LAN) and an Internet network, but also be in a form of being connected through a universal serial bus (USB) port and a wireless module.

The communication apparatus 210 may receive user account information (e.g., a manager account) from a user terminal apparatus. For example, user account information may include management information of an image forming apparatus, management information of a toner refill apparatus, management information of a network, user information, etc. Management information of an image forming apparatus may include data identification information of all image forming apparatuses included in an account, management information of a toner refill apparatus may include identification information of all toner refill apparatuses included in an account, and management information of a network may include information of all networks included in an account. Also, user information may include inherent information that can identify a user terminal apparatus (e.g., the name of the user, the ID, the employee identification number, the resident registration number, the phone number, the e-mail address, etc.) and information on the group to which the user belongs. User information may also include additional information for managing the user (e.g., the nation information, the staff level, etc.).

The communication apparatus 210 may be provided with user information from an image forming apparatus. For example, the communication apparatus 210 may be provided with user information corresponding to a user belonging to an image forming apparatus from the image forming apparatus. The communication apparatus 210 may be notified of the fact that printing data was received from a user who is not a user belonging to a group from an image forming apparatus. In an example, the communication apparatus 210 may notify the fact in this regard to the manager.

Also, the communication apparatus 210 may receive information on an image forming apparatus from the image forming apparatus. For example, information on an image forming apparatus may include identification information (e.g., a serial number, a MAC address, etc.), model information, information on an available toner refill apparatus, information on the storable maximum capacity of toner, information on the remaining amount of toner, information on the possible toner refill quantity, information on the connected network, etc. Also, the communication apparatus 210 may receive information on a toner refill apparatus from an image forming apparatus or a toner refill apparatus. For example, information on a toner refill apparatus may include identification information (e.g., a serial number), model information, model information on a compatible image forming apparatus, information on the initial capacity, information on the remaining amount of toner, information on the image forming apparatus that performed refill, etc. of the toner refill apparatus.

The memory 220 may store user account information, information on an image forming apparatus, and information on a toner refill apparatus. The memory 220 may be implemented as a storage medium inside the external apparatus 200 or an external storage medium, for example, a removable disk including a USB memory, a file server through a network, etc.

The processor 230 is to perform control for each component inside the external apparatus 200. For example, the processor 230 may store the received user account information, information on an image forming apparatus, information on a toner refill apparatus, etc. in the memory 220.

The processor 230 may provide identification regarding whether toner refill is possible and information related to purchase of a toner refill apparatus to a user terminal apparatus through the communication apparatus 210. For example, the processor 230 may identify the possible toner refill quantity of each of a plurality of image forming apparatuses, and sum the possible toner refill quantities of each image forming apparatus. The processor 230 may compare the summed possible toner refill quantities of the plurality of image forming apparatuses and the toner quantity of one toner refill apparatus. The processor 230 may identify whether toner refill is possible based on the comparison. Alternatively, the processor 230 may compare the sum of the remaining amounts of toner of image forming apparatuses using the same toner refill apparatus and the toner quantity of the toner refill apparatus and thereby identify whether toner refill is possible. Alternatively, the processor 230 may compare the sum of the possible toner refill quantities of the image forming apparatuses of which ratio of the remaining amount of toner is smaller than the set standard ratio among the plurality of identified image forming apparatuses and the toner quantity of the toner refill apparatus. The processor 230 may identify whether toner refill is possible based on the result of comparison.

If it is identified that toner refill is possible and a user terminal apparatus is connected, the processor 230 may transmit a refill guide message to the user terminal apparatus through the communication apparatus 210. In an example, the processor 230 may determine the model of the toner refill apparatus for refilling an image forming apparatus, and provide information on the determined model of the toner refill apparatus and identification information of the image forming apparatus together through the communication apparatus 210. Also, when information on the remaining amounts of toner of image forming apparatuses is updated, the processor 230 may reidentify the possible toner refill quantity of each image forming apparatus.

The processor 230 may provide information related to purchase of a toner refill apparatus to the user terminal apparatus through the communication apparatus 210. For example, information related to purchase of a toner refill apparatus may be information on a toner refill apparatus such as a model name of the toner refill apparatus, URL information of a seller of the toner refill apparatus, price information, toner quantity information, etc. Alternatively, the processor 230 may provide a purchase guide message to the user terminal apparatus through the communication apparatus 210.

An example operating method of the aforementioned external apparatus 200 may be implemented in a form of a command executable by a computer or a processor or a non-transitory computer-readable storage medium storing data. The example operating method may be formed as a program that can be executed at a computer, and it may be implemented at a generic-purpose digital computer that operates such a program by using a computer-readable storage medium. Such a non-transitory computer-readable storage medium may include a read-only memory (ROM), a random-access memory (RAM), a flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, a magnetic tape, a floppy disk, a magneto-optical data storage apparatus, an optical data storage apparatus, a hard disk, a solid-state disk (SSD), and commands or software, related data, data files, and data structures. Also, the computer-readable storage medium may be any apparatus that can provide commands or software, related data, data files, and data structures to a processor or a computer so that the processor or the computer can execute commands.

Hereinafter, an example process of displaying a refill guide message and a purchase guide message will be described.

Figure 9:
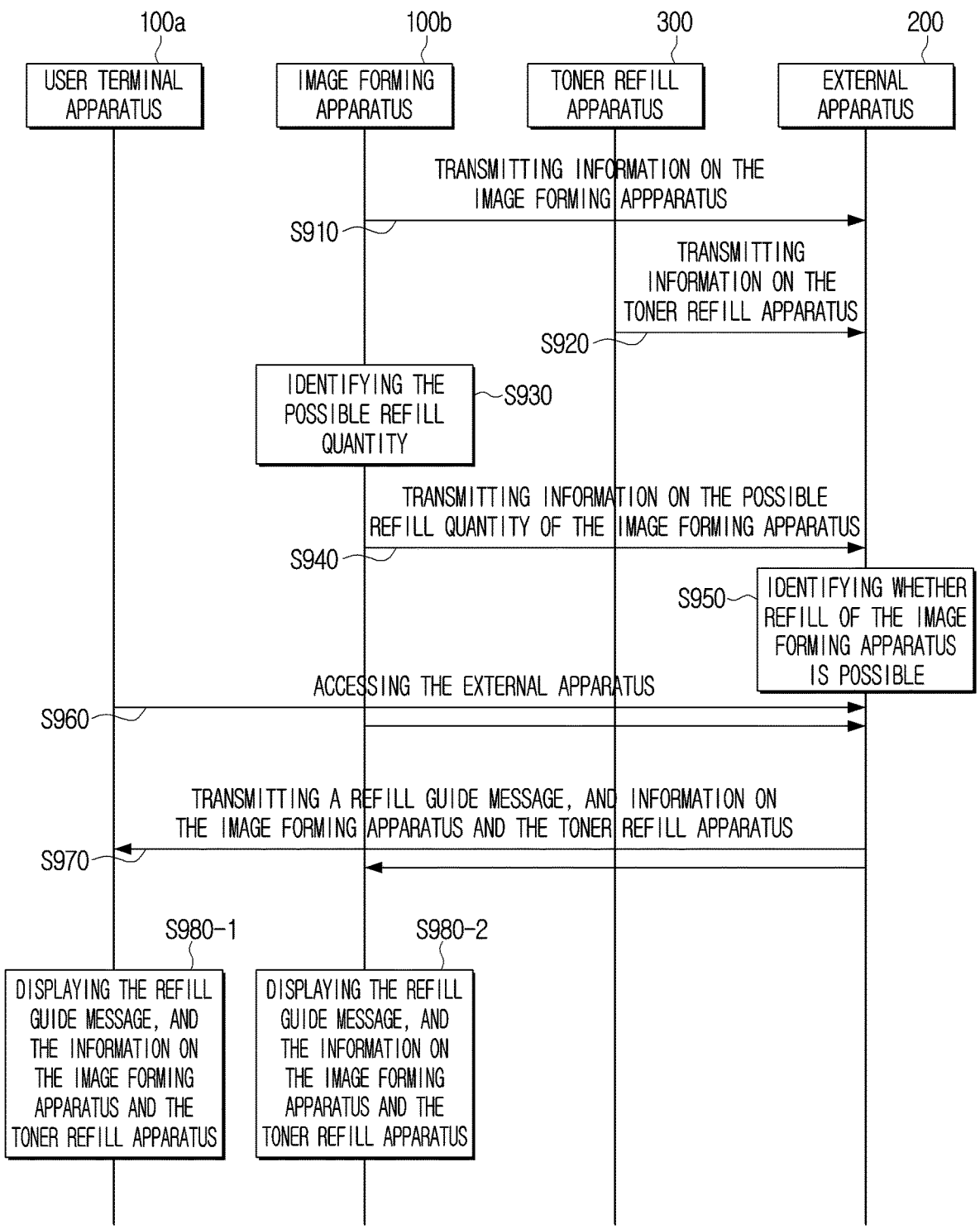
FIG. 9 is a sequence diagram illustrating a process of displaying a refill guide message at a user terminal apparatus according to an example.

FIG. 9 is a sequence diagram illustrating a process of displaying a refill guide message at a user terminal apparatus according to an example.

Referring to FIG. 9, the image forming apparatus 100b may transmit information on the image forming apparatus 100b to the external apparatus 200 at operation S910. For example, information on the image forming apparatus 100b may include identification information (e.g., a serial number, a MAC address, etc.), model information, information on an available toner refill apparatus, information on a storable maximum capacity of toner, information on a remaining amount of toner, information on a possible toner refill quantity, information on a connected network, etc. In a case in which the information on the image forming apparatus is changed, the image forming apparatus 100b may transmit the information on the image forming apparatus to the external apparatus 200. Also, while one image forming apparatus 100b is illustrated in FIG. 9, a plurality of image forming apparatuses 100b may be connected to the external apparatus 200 and each image forming apparatus 100b may transmit its information to the external apparatus 200.

The toner refill apparatus 300 may transmit information on the toner refill apparatus 300 to the external apparatus 200 at operation S920. For example, information on the toner refill apparatus 300 may include identification information (e.g., a serial number), model information, model information on a compatible image forming apparatus, information on an initial capacity, information on a remaining amount of toner, information on an image forming apparatus that performed refill, etc. of the toner refill apparatus 300. The toner refill apparatus 300 may include a communication apparatus and directly transmit the information on the toner refill apparatus 300 to the external apparatus 200. In a case in which the toner refill apparatus 300 is connected with the image forming apparatus 100b, the toner refill apparatus 300 may indirectly transmit its information to the external apparatus 200 through the image forming apparatus 100b.

The image forming apparatus 100b may identify the possible toner refill quantity at operation S930. In a case in which a user uses the image forming apparatus 100b, the possible toner refill quantity of the image forming apparatus 100b may change. As an example, the image forming apparatus 100b may include a first image forming apparatus and a second image forming apparatus. Also, it may be identified that the possible toner refill quantity of the first image forming apparatus is 2K, and the possible toner refill quantity of the second image forming apparatus is 3K. The image forming apparatus 100b may transmit information on the possible toner refill quantity of the image forming apparatus to the external apparatus 200 at operation S940. That is, the first image forming apparatus may transit information that the possible toner refill quantity is 2K to the external apparatus 200, and the second image forming apparatus may transmit information that the possible toner refill quantity is 3K to the external apparatus 200.

The external apparatus 200 may identify whether refill of the image forming apparatus 100b is possible at operation S950. Also, the external apparatus may receive information that the remaining amount of toner is 6K from the toner refill apparatus 300. The external apparatus may identify that the remaining amount of toner of the toner refill apparatus 300 is greater than 5K which is a value obtained by summing the possible toner refill quantity of the first image forming apparatus and the possible toner refill quantity of the second image forming apparatus. Accordingly, the external apparatus 200 may identify that toner of the first and second image forming apparatuses may be refilled by the toner refill apparatus 300.

The user terminal apparatus 100a may access the external apparatus 200 at operation S960. In the example of FIG. 9, it is described that access by the user terminal apparatus 100a is performed after identifying whether refill of an image forming apparatus is possible. However, in other examples, access to the external apparatus 200 by the user terminal apparatus 100a may be performed prior to that.

The external apparatus 200 may transmit a refill guide message, information on an image forming apparatus, and information on a toner refill apparatus to the user terminal apparatus 100a at operation S970. For example, information on an image forming apparatus may include identification information of the image forming apparatus, and information on a toner refill apparatus may include model information. The user terminal apparatus 100a may display the received refill guide message, and information on an image forming apparatus and a toner refill apparatus at operation S980-1.

As described above, the image forming apparatus 100b may perform the function of the user terminal apparatus 100a. In an example, the external apparatus 200 may transmit a refill guide message, and information on an image forming apparatus and a toner refill apparatus to the image forming apparatus 100b at operation S970. The image forming apparatus 100b may display the received refill guide message, and information on an image forming apparatus and a toner refill apparatus at operation S980-2.

FIG. 10 is a sequence diagram illustrating a process of displaying a purchase guide message at a user terminal apparatus according to an example.

Referring to FIG. 10, the first image forming apparatus 100b-1 may transmit information on the first image forming apparatus 100b-1 to the external apparatus 200 at operation S1010-1, and the second image forming apparatus 100b-2 may transmit information on the second image forming apparatus 100b-2 to the external apparatus 200 at operation S1010-2. The first image forming apparatus 100b-1 may identify the possible toner refill quantity of the first image forming apparatus 100b-1 at operation S1020-1, and the second image forming apparatus 100b-2 may identify the possible toner refill quantity of the second image forming apparatus 100b-2 at operation S1020-2. The first image forming apparatus 100b-1 may transmit information on the possible toner refill quantity of the first image forming apparatus 100b-1 to the external apparatus 200 at operation S1030-1, and the second image forming apparatus 100b-2 may transmit information on the possible toner refill quantity of the second image forming apparatus 100b-2 to the external apparatus 200 at operation S1030-2. The external apparatus 200 may sum the possible refill quantities of the first and second image forming apparatuses 100b-1, 100b-2, and identify whether toner refill is possible at operation S1040. The user terminal apparatus 100a (or, the first image forming apparatus 100b-1) may access the external apparatus 200 at operation S1050. As the aforementioned process is the same process as described in FIG. 9, a repetitive description in this regard will be omitted.

The external apparatus 200 may transmit a purchase guide message and information related to purchase to the user terminal apparatus 100a (or, the first image forming apparatus 100b-1) at operation S1060. For example, a purchase guide message may be included in a refill guide message, and information related to purchase may be transmitted together with a refill guide message. As an example, information related to purchase may include a model name of the toner refill apparatus, URL information of a seller of the toner refill apparatus, price information, toner quantity information, etc. The user terminal apparatus 100a may display the received purchase guide message and information related to purchase at operation S1070-1. In a case in which the first image forming apparatus 100b-1 performs the function of the user terminal apparatus 100a, the first image forming apparatus 100b-1 may display the received purchase guide message and information related to purchase at operation S1070-2. The user terminal apparatus 100a (or, the first image forming apparatus 100b-1) may access the website of the seller of the toner refill apparatus according to a user command selecting the displayed URL, and perform a purchase process of the toner refill apparatus.

While examples have been shown and described, the disclosure is not limited to the described examples, and it is apparent that various modifications can be made by those having ordinary skill in the art to which the disclosure belongs, without departing from the gist of the disclosure as claimed by the appended claims, and such modifications are within the scope of the descriptions of the claims.

What is claimed is:
1. A method, the method comprising:
receiving, at a communication apparatus of a user terminal, information on a possible first toner refill quantity of a plurality of grouped image forming apparatuses and a toner quantity of one toner refill apparatus from an external apparatus;
in response to receiving the information, controlling, by a processor of the user terminal, a display to display a guide message including information on:
a time point of toner refill of the plurality of grouped image forming apparatuses;
each of the image forming apparatuses which is a subject of toner refill within the group; and
a possible second toner refill quantity of each of the image forming apparatuses at the time point of toner refill.
2. The method of claim 1, further comprising:
controlling, by the processor of the user terminal, the display to display information on the toner refill apparatus together with the guide message, wherein the information on the toner refill apparatus includes a model name of the toner refill apparatus, uniform resource locator (URL) information of a seller of the toner refill apparatus, price information, or the toner quantity information.

3. The method of claim 1, further comprising:
controlling, by the processor of the user terminal, the display to display identification information and history information of the plurality of image forming apparatuses which need toner refill among image forming apparatuses managed by the external apparatus together with the guide message.

4. The method of claim 1, further comprising:
controlling, by the processor of the user terminal, the display to display a changed state of a remaining amount of toner of the toner refill apparatus as toner refill by the toner refill apparatus is performed for an image forming apparatus among the plurality of image forming apparatuses.

5. The method of claim 1, further comprising:
managing, by a server of the external apparatus, an image forming apparatus among the plurality of image forming apparatuses.

6. A method of managing an image forming apparatus, the method comprising:
identifying a possible first toner refill quantity of a plurality of grouped image forming apparatuses;
identifying a possibility of toner refill for each of the image forming apparatuses which are subjects of toner refill within the group based on the identified possible first toner refill quantity of the plurality of image forming apparatuses and a toner quantity of one toner refill apparatus; and
providing a guide message, in response to identifying the possibility of toner refill for each of the image forming apparatuses which are subjects of toner refill within the group, including information on a time point of toner refill of the plurality of grouped image forming apparatuses, each of the image forming apparatuses which is a subject of toner refill within the group, and a possible second toner refill quantity of each of the image forming apparatuses at the time point of toner refill based on the identified possibility of toner refill.

7. The method of claim 6, wherein the identifying comprises:
comparing the first toner refill quantity with a minimum capacity of the toner quantity of the one toner refill apparatus; and
based on the first toner refill quantity being greater than or equal to the minimum capacity, identifying that the plurality of image forming apparatuses within the group are subjects of toner refill.

8. The method of claim 7, wherein the providing of the guide message comprises:
providing a message to guide purchase of a toner refill apparatus among a toner refill apparatus including a toner quantity of the minimum capacity, a toner refill apparatus compatible with the toner refill apparatus including a toner quantity of the minimum capacity, or a toner refill apparatus which includes a toner quantity of a capacity greater than the minimum capacity and smaller than the first toner quantity and is compatible.

9. The method of claim 6, further comprising:
after filling the toner of a first image forming apparatus which is a subject of toner refill within the group by using the one toner refill apparatus, based on a remaining amount of the toner quantity of the toner refill apparatus being smaller than the possible toner refill quantity of a second image forming apparatus within the group, providing a message to guide toner refill of the second image forming apparatus.

10. The method of claim 6, further comprising:
storing address information, model information, information on a remaining amount of toner, or information on an available toner refill apparatus of each of the plurality of image forming apparatuses; and
based on the stored information on the remaining amount of toner being updated, reidentifying the possible toner refill quantity of each of the plurality of image forming apparatuses.

11. The method of claim 6, wherein the providing of the guide message comprises:
based on receiving user account information from an image forming apparatus or a user terminal apparatus, providing the guide message to the image forming apparatus or the user terminal apparatus that transmitted the user account information.

12. The method of claim 6,
wherein the providing of the guide message comprises providing information on the toner refill apparatus together with the guide message,
and wherein the information on the toner refill apparatus includes a model name of the apparatus, uniform resource locator (URL) information of a seller of the toner refill apparatus, price information, or the toner quantity information.

13. The method of claim 6, wherein the providing of the guide message comprises:
providing identification information and history information of the plurality of image forming apparatuses which need toner refill among the entire image forming apparatuses managed by an external apparatus together with the guide message.

14. The method of claim 6, further comprising:
providing a changed state of a remaining amount of toner of the toner refill apparatus as toner refill by the toner refill apparatus is performed for an image forming apparatus among the plurality of image forming apparatuses.

15. A non-transitory computer readable recording medium having a program executing a management method of an image forming apparatus recorded thereon, the non-transitory computer readable recording medium comprising:
instructions to identify a possible first toner refill quantity of a plurality of grouped image forming apparatuses;
instructions to identify a possibility of toner refill for each of the image forming apparatuses which are subjects of toner refill within the group based on the identified possible first toner refill quantity of the plurality of image forming apparatuses and a toner quantity of one toner refill apparatus; and
instructions to provide a guide message including information on a time point of toner refill of the plurality of grouped image forming apparatuses, each of the image forming apparatuses which is a subject of toner refill within the group, and a possible second toner refill quantity of each of the image forming apparatuses at the time point of toner refill based on the identified possibility of toner refill.

* * * * *